United States Patent [19]

Kida et al.

[11] Patent Number: 5,346,762
[45] Date of Patent: Sep. 13, 1994

[54] LAMINATED POLYPHENYLENE SULFIDE FILM AND PROCESS FOR PRODUCING THE SAME

[75] Inventors: Kenji Kida, Otsu; Shinichiro Miyaji, Shiga; Yukichi Deguchi, Otsu, all of Japan

[73] Assignee: Toray Industries, Inc., Japan

[21] Appl. No.: 958,338

[22] PCT Filed: Apr. 17, 1992

[86] PCT No.: PCT/JP92/00486

§ 371 Date: Jan. 28, 1993

§ 102(e) Date: Jan. 28, 1993

[87] PCT Pub. No.: WO92/18331

PCT Pub. Date: Oct. 29, 1992

[30] Foreign Application Priority Data

Apr. 18, 1991 [JP] Japan .................................. 3-086875

[51] Int. Cl.$^5$ .................... B32B 27/06; B32B 27/28
[52] U.S. Cl. .................... 428/336; 428/419; 428/910
[58] Field of Search ............ 428/419, 910, 336; 264/235.8, 346

[56] References Cited

U.S. PATENT DOCUMENTS

| 4,011,121 | 3/1977 | Doss . |
| 5,130,181 | 7/1992 | Mutaguchi et al. ............ 428/212 |

FOREIGN PATENT DOCUMENTS

| 2-45144 | 2/1990 | Japan . |
| 3-227624 | 10/1991 | Japan . |
| 4219236 | 8/1992 | Japan . |
| 2184977A | 7/1987 | United Kingdom . |

*Primary Examiner*—P. C. Sluby
*Attorney, Agent, or Firm*—Austin R. Miller

[57] ABSTRACT

A laminated polyphenylene sulfide film having excellent adhesiveness, especially heatsealability, and good mechanical properties and heat resistance, as well as a process for producing the same are disclosed. A central layer is constituted by a biaxially oriented polyphenylene sulfide film and a surface layer is constituted by phenylene sulfide copolymer containing a copolymerization unit other than p-phenylene sulfide unit in an amount of not less than 3 mol % and less than 50 mol %, so that the film has an improved adhesiveness and heat-sealability while retaining the heat resistance and mechanical properties of biaxially oriented polyphenylene sulfide films.

5 Claims, No Drawings

LAMINATED POLYPHENYLENE SULFIDE FILM AND PROCESS FOR PRODUCING THE SAME

TECHNICAL FIELD

This invention relates to a laminated polyphenylene sulfide film and a process for producing the same. More particularly, this invention relates to a laminated polyphenylene sulfide film which has excellent adhesiveness, particularly heatsealability, as well as excellent mechanical properties and heat resistance, and to a process for producing the same.

BACKGROUND ART

Polyphenylene sulfide films have excellent mechanical properties and heat resistance, so that various uses thereof are expected and have been proposed. For example, Japanese laid-open patent application (Kokai) No. 57-121052 discloses a non-oriented polyphenylene sulfide sheet, and Japanese laid-open patent application (Kokai) No. 54-142275 discloses a biaxially oriented polyphenylene sulfide film. Although the non-oriented sheets have high tear strengths, if they are exposed to a high temperature, their mechanical strengths are sharply decreased, and they have poor long term heat resistances. On the other hand, biaxially oriented films have much improved mechanical properties other than tear strength, and their chemical resistances and long term heat resistances are extremely high. However, as is apparent from the fact that they have excellent chemical resistances and heat resistances, since their surfaces are inert, they have poor adhesiveness. Therefore, in order to use them for wrapping, electrical insulation or for general industrial applications, it is necessary to give adhesiveness, particularly heatsealability.

As a method for promoting adhesiveness, it is known to perform corona discharge treatment (Japanese laid-open patent application (Kokai) No. 57-187327). However, with this method, although the adhesiveness is slightly improved, it is insufficient. Further, improvement in heatsealability is scarcely observed. It has also been proposed to apply an adhesive. However, not only does the adhesive per se have poor heat resistance, but also the deterioration of the adhesive by heat accelerates the deterioration of the polyphenylene sulfide film, so that the heat resistance is extremely poor.

To overcome the drawback of the biaxially oriented polyphenylene sulfide films that their tear strengths are poor, a film in which a copolymerization unit other than p-phenylene sulfide unit is copolymerized has been disclosed (Japanese laid-open patent application (Kokai) No. 61-98526). However, although the improvement in the tear strength of the film is observed, other mechanical properties are deteriorated.

DISCLOSURE OF THE INVENTION

An object of the present invention is to overcome these drawbacks in the prior art and to provide a polyphenylene sulfide film having excellent adhesiveness, particularly heatsealability, as well as good mechanical properties and heat resistance.

Another object of the present invention is to provide a process for producing the above-described polyphenylene sulfide film.

The present invention provides a laminated polyphenylene sulfide film comprising a biaxially oriented layer (layer B) consisting essentially of a biaxially oriented poly-p-phenylene sulfide film, and a surface layer (layer A) consisting essentially of a phenylene sulfide copolymer film in which at least one copolymerization unit other than p-phenylene sulfide unit is copolymerized with p-phenylene sulfide unit, which is laminated on at least one surface of the biaxially oriented layer, the resin compositions constituting said layers satisfying the following equations (1)–(4):

$$50 \leq PPSF(A) \leq 95 \quad (1)$$

$$PPSF(B) \leq 90 \quad (2)$$

$$3 \leq COPF(A) < 50 \quad (3)$$

$$PPSF(A) < PPSF(B) \quad (4)$$

wherein

PPSF(A) means content of p-phenylene sulfide unit in layer A in terms of mol % with respect to the total repeating units in layer A;

PPSF(B) means content of p-phenylene sulfide unit in layer B in terms of mol % with respect to the total repeating units in layer B; and COPF(A) means content of copolymerization unit in layer A, whose content is the second largest next to that of p-phenylene sulfide unit, in terms of mol % with respect to the total repeating units in layer A.

The present invention also provides a process for producing a laminated polyphenylene sulfide film comprising the steps of laminating on at least one surface of a poly-p-phenylene sulfide composition (B) a phenylene sulfide copolymer composition (A) in which at least one copolymerization unit other than p-phenylene sulfide unit is copolymerized with p-phenylene sulfide unit by co-extrusion to obtain a laminated sheet; biaxially stretching the laminated sheet; and heat-setting the resultant; the compositions of the composition (A) and the composition (B) satisfying the following equations (5)–(8):

$$50 \leq PPSP(A) \leq 95 \quad (5)$$

$$PPSP(B) \geq 90 \quad (6)$$

$$3 \leq COPP(A) < 50 \quad (7)$$

$$PPSP(A) < PPSP(B) \quad (8)$$

wherein

PPSP(A) means content of p-phenylene sulfide unit in the phenylene sulfide copolymer composition (A) in terms of mol % with respect to the total repeating units in composition (A);

PPSP(B) means content of p-phenylene sulfide unit in the poly-p-phenylene sulfide composition (B) in terms of mol % with respect to the total repeating units in composition (B); and COPP(A) means content of copolymerization unit in the phenylene sulfide copolymer composition (A), whose content is the second largest next to that of p-phenylene sulfide unit, in terms of mol % with respect to the total repeating units in composition (A).

The laminated polyphenylene sulfide film according to the present invention has the following effects due to the above-described constitution:

(1) The adhesiveness and heatsealability are good.

(2) Mechanical properties such as strength and tear strength are excellent.

(3) Heat resistance is good.

BEST MODE FOR CARRYING OUT THE INVENTION

In the present invention, layer A is a layer located on at least one surface of a biaxially oriented layer (layer B) and constituting at least one surface of the laminated polyphenylene sulfide film according to the present invention.

The film constituting the surface layer is a phenylene sulfide copolymer film. In the present invention, phenylene sulfide copolymer film means a film consisting of a phenylene sulfide copolymer resin containing a phenylene sulfide copolymer as a major constituent, whose phenylene sulfide copolymer content is not less than 80 wt %, preferably not less than 90 wt %, still more preferably not less than 95 wt % based on the weight of the film. It is acceptable to contain organic and/or inorganic additives other than phenylene sulfide copolymer, inert particles and the like, as long as the content is less than 20 wt %, preferably less than 10 wt %, still more preferably less than 5 wt %.

The phenylene sulfide copolymer herein means the copolymer containing p-phenylene sulfide unit as a major recurring unit and containing one or more copolymerization units so that the following equations (1) and (3) are satisfied:

$$50 \leq PPSF(A) \leq 95 \quad (1)$$

$$3 \leq COPF(A) < 50 \quad (3)$$

wherein

PPSF(A) means content of p-phenylene sulfide unit in layer A in terms of mol % with respect to the total repeating units in layer A; and COPF(A) means content of copolymerization unit in layer A, whose content is the second largest next to that of p-phenylene sulfide unit, in terms of mol % with respect to the total repeating units in layer A;

The content of p-phenylene sulfide unit in the polyphenylene sulfide copolymer with respect to the total recurring units is not less than 50 mol % and not more than 95 mol %, preferably not less than 70 mol % and not more than 92 mol %, still more preferably not less than 75 mol % and not more than 90 mol %. If the content of the p-phenylene sulfide unit is less than 50 mol %, the heatsealability is saturated but the mechanical properties and heat resistance are deteriorated, even when the film is formed into a laminated film, so that it is not preferred. On the other hand, if the content is more than 95 mol %, heatsealability is not obtained, so that it is not preferred. Examples of the copolymerization units include m-phenylene sulfide unit,

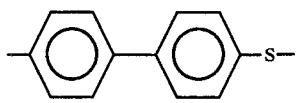

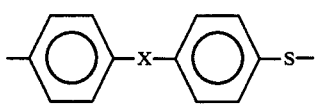

(wherein X represents alkylene group, CO or $SO_2$)

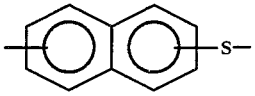

and

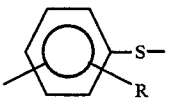

(wherein R represents alkyl, nitro, phenyl or alkoxy group).

A plurality of these units may exist in the copolymer. The preferred copolymerization unit is m-phenylene sulfide unit. The contents of these copolymerization units are such that the content of the copolymerization unit whose content is the second largest next to that of p-phenylene sulfide unit is not less than 3 mol % and not more than 50 mol %, preferably not less than 5 mol % and not more than 30 mol %, still more preferably not less than 8 mol % and not more than 25 mol % with respect to the total recurring units. If the content of this copolymerization unit is less than 3 mol %, heatsealability is not obtained, so that it is not preferred, and if the content is more than 50 mol %, the mechanical properties and heat resistance are deteriorated, so that it is not preferred.

The remainder of the recurring units of the phenylene sulfide copolymer may be constituted by other copolymerizable units. However, it is preferred that the content of trifunctional phenylene sulfide units represented by

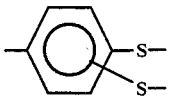

be not more than 1 mol % with respect to the total copolymer.

In the phenylene sulfide copolymer employed in the present invention, the mode of copolymerization may be random or block, and random is preferred. The copolymerization composition may be determined by any of the means appropriate to the composition.

The melting point of the phenylene sulfide copolymer film employed in the present invention is preferably not lower than 200° C. and not higher than 285° C. The melt viscosity of the copolymer film is preferably 50–20,000 poise, more preferably 100–10,000 poise, at 300° C. and at a shear rate of 200 $sec^{-1}$. Further, it is preferred that the phenylene sulfide copolymer film employed in the present invention be a non-oriented film because a high heatsealability is obtained. The degree of planar orientation of the phenylene sulfide copolymer film is preferably not more than 0.020, more preferably not more than 0.010.

In the present invention, the central layer (layer B) is a layer located about the central portion in the direction of thickness of the film of the present invention, which is made of a biaxially oriented poly-p-phenylene sulfide film.

In the present invention, the biaxially oriented poly-p-phenylene sulfide film means a film consisting of a poly-p-phenylene sulfide resin containing biaxially oriented poly-p-phenylene sulfide as a major component, that contains the poly-p-phenylene sulfide in an amount of not less than 80 wt %, preferably not less than 90 wt %, more preferably not less than 95 wt %. It is acceptable to contain organic and/or inorganic additives other than poly-p-phenylene sulfide, inert particles and the like, as long as the content is less than 20 wt %, preferably less than 10 wt %, still more preferably less than 5 wt %.

The term "poly-p-phenylene sulfide" herein means a polymer containing p-phenylene sulfide unit in an amount of not less than 90 mol % as shown by the equation (2) below, preferably not less than 95 mol %, more preferably not less than 97 mol %, with respect to the total recurring units.

$$PPSF(B) \geq 90 \qquad (2)$$

wherein PPSF(B) means content of p-phenylene sulfide unit in layer B in terms of mol % with respect to the total repeating units in composition (B).

If the content of p-phenylene sulfide unit is less than 90 mol %, the crystallinity, the thermal transition temperature and the like of the polymer are lowered, so that the high heat resistance and good mechanical properties which are characteristic to biaxially oriented poly-p-phenylene sulfide films are deteriorated, thus it is not preferred. As long as the content is less than 10 mol %, the poly-p-phenylene sulfide may contain other copolymerizable recurring units such as the bifunctional and trifunctional units mentioned in the description of the phenylene sulfide copolymer described above. It should be noted, however, that it is important that the content of p-phenylene sulfide unit in the biaxially oriented poly-p-phenylene sulfide film constituting the layer B be higher than that in the phenylene sulfide copolymer film constituting the layer A, as indicated by the following equation (4):

$$PPSF(A) < PPSF(B) \qquad (4)$$

wherein
PPSF(A) means content of p-phenylene sulfide unit in layer A in terms of mol % with respect to the total repeating units in layer A; and
PPSF(B) means content of p-phenylene sulfide unit layer B in terms of mol % with respect to the total repeating units in layer B.

The melt viscosity of the biaxially oriented poly-p-phenylene sulfide film is preferably 100–50,000 poise, more preferably 500–20,000 poise, at 300° C. at a shear rate of 200 sec$^{-1}$.

In the laminated polyphenylene sulfide film according to the present invention, in view of the balance among the heatsealability, mechanical properties and heat resistance, the thickness of the phenylene sulfide copolymer film constituting layer A is preferably 0.01–5 μm, more preferably 0.05–3 μm, and the thickness of the biaxially oriented poly-p-phenylene sulfide film constituting layer B is preferably 0.5–1000 μm. The heat shrinkage of the laminated polyphenylene sulfide film heated at 230° C. for 10 minutes is preferably not more than 10%, more preferably not more than 6%. Further, in view of ease of handling and processability, the surface of one surface layer of the laminated polyphenylene sulfide film of the present invention preferably has a surface roughness of not less than 0.005 μm and not more than 0.10 μm, more preferably not less than 0.01 μm and not more than 0.07 μm.

The process for producing the laminated polyphenylene sulfide film according to the present invention will now be described.

The laminated polyphenylene sulfide film of the present invention comprises the biaxially oriented poly-p-phenylene sulfide film constituting the central layer and the phenylene sulfide copolymer film constituting the surface layer which is laminated on at least one surface of the central layer.

In the present invention, the phenylene sulfide copolymer composition (A) constituting the surface layer and the poly-p-phenylene sulfide composition (B) constituting the central layer satisfy the following equations (5)–(8):

$$50 \leq PPSP(A) \leq 95 \qquad (5)$$

$$PPSP(B) \geq 90 \qquad (6)$$

$$3 \leq COPP(A) < 50 \qquad (7)$$

$$PPSP(A) < PPSP(B) \qquad (8)$$

wherein
PPSP(A) means content of p-phenylene sulfide unit in the phenylene sulfide copolymer composition (A) in terms of mol % with respect to the total repeating units in composition (A);
PPSP(B) means content of p-phenylene sulfide unit in the poly-p-phenylene sulfide composition (B) in terms of mol % with respect to the total repeating units in composition (B); and
COPP(A) means content of copolymerization unit in the phenylene sulfide copolymer composition (A), whose content is the second largest next to that of p-phenylene sulfide unit, in terms of mol % with respect to the total repeating units in composition (A).

The phenylene sulfide copolymer employed in the present invention may be obtained by various polymerization methods. Among these, a method in which an alkaline metal sulfide, p-dihalobenzene (major component monomer) and a minor component monomer are blended so as to satisfy the above-described equations (5) and (7) and the resulting mixture is subjected to polymerization in a polar solvent in the presence of a polymerization promoter at a high temperature and high pressure is preferred because the degree of polymerization of the produced polymer may be increased. It is best preferred to employ sodium sulfide as the alkaline metal sulfide, p-dichlorobenzene as the major component monomer and N-methylpyrrolidone as the solvent. Examples of the minor component monomer which is made to coexist with p-dihalobenzene (major component monomer) include

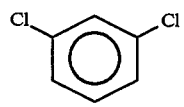

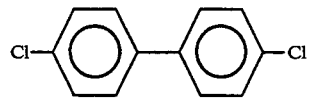

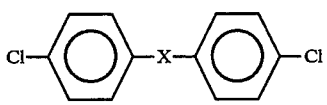

(wherein X represents alkylene group, CO or SO₂)

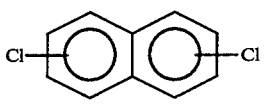

and

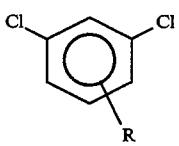

(wherein R represents alkyl group, nitro, phenyl, or alkoxy group).

A plurality of these minor component monomers may exist. The preferred minor component monomer is

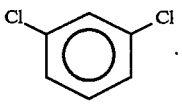

On the other hand, the poly-p-phenylene sulfide employed in the present invention may be obtained by the polymerization method similar to that for producing the phenylene sulfide copolymer. However, the minor component is not blended or blended in a smaller amount so that the above-described equations (6) and (8) are satisfied.

Needless to say, to control the melt viscosity of the phenylene sulfide copolymer or the poly-p-phenylene sulfide, a trifunctional monomer of the formula

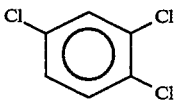

may be blended in the polymerization system.

To the thus obtained phenylene sulfide copolymer and poly-p-phenylene sulfide, inorganic or organic additives may be added, if necessary, to provide phenylene sulfide copolymer composition and poly-p-phenylene sulfide composition.

The layers may be laminated by coating method, lamination method or co-extrusion method. To make the surface layer contributing to the heatsealability as thin as possible, coating method and co-extrusion method are preferred. Further, in the present invention, lamination by co-extrusion is preferred because the thickness of each layer may be easily controlled. In the lamination by co-extrusion method, although the phenylene sulfide copolymer composition (hereinafter also referred to as "composition A") constituting the surface layer and the poly-p-phenylene sulfide composition (hereinafter also referred to as "composition B") are joined and laminated in a polymer passage between a melt-extrusion apparatus and a die, it is preferred that the compositions are joined and laminated at an upstream portion of the die (e.g., at manifold). That is, composition A and composition B which are supplied to different melt extrusion apparatuses and which are melted by being heated to temperatures higher than the respective melting points are laminated into two- or three-layered structure in the melted state in a joining apparatus provided between the extrusion apparatuses and the die, and the resulting laminate is extruded from the die in the form of a slit. The resulting melted laminate is cooled to a temperature below the glass transition temperature of composition B on a rotating cooling drum to obtain a substantially amorphous laminated sheet. The melt extrusion apparatus may be one well-known in the art, and an extruder is simple and preferred. The joining apparatus is one having a function to laminate the compositions in the melted state into two-layered structure (composition A/composition B) or into three-layered structure (composition A/composition B/composition A', wherein compositions A and A' are phenylene sulfide copolymers respectively forming the surface layers, and it is preferred that compositions A and A' are the same composition).

Then the amorphous laminated sheet is biaxially stretched at a temperature higher than the glass transition temperature of composition B so as to at least biaxially orient the central layer, and the resultant is heat-set, thereby obtaining the laminated polyphenylene sulfide film of the present invention. Such a process for producing the laminated polyphenylene sulfide film may be substantially the seine as a method for producing a single-layered poly-p-phenylene sulfide film except for the laminate structure and the melt extrusion step, so that the method described in Japanese Patent Publication (Kokoku) No. 59-5099 and the like may be employed. That is, the laminated sheet is stretched in the longitudinal direction at 80°–120° C. at a stretching ratio of 2.0–5.0 times the original length and then in the direction perpendicular to the longitudinal direction at 80°–120° C. at a stretching ratio of 2.0–5.0 times the original length to obtain a biaxially stretched laminated film. Then the thus obtained biaxially oriented laminated film is heat set at 220°–290° C. under constant length. To further promote the heatsealability and to exploit the mechanical properties of biaxially oriented poly-p-phenylene sulfide films, the temperature of the heat set is preferably not lower than the melting point of the phenylene sulfide copolymer composition and not higher than the melting point of the poly-p-phenylene sulfide composition. By this treatment, the phenylene sulfide copolymer layer is deoriented. Further, if necessary, the laminated sheet may be relaxed in the longitudinal and transverse directions in a range between 0–20%, respectively.

In the present invention, to promote the ease of handling and processability of the film, it is preferred to appropriately control the surface roughness of the surface layer. As the method for controlling the surface roughness of the surface layer, (i) a method in which inert particles are added to the polymer of composition A constituting the surface layer, (ii) a method in which inert particles are added to composition B so as to control the surface roughness of the interface thereof with composition A, thereby indirectly controlling the surface roughness of the surface of composition A, and (iii) a method in which the above-mentioned methods (i) and (ii) are combined, are preferably employed. For electric insulation uses, to prevent electric breakdown, it is preferred that composition B does not substantially contain inert particles and that the surface of the laminated film be configured by adding inert particles to composition A. The term "inert particles" herein means an inorganic filler such as silica, alumina, calcium carbonate, barium carbonate, calcium silicate, magnesium oxide, titanium oxide or zinc oxide, or organic polymer particles which are not melted at 300° C. (e.g., cross-linked polystyrene described in Japanese laid-open patent application (Kokai) No. 61-181837) which are added for the purpose of controlling surface roughness, and it is acceptable that the particles precipitated during the polymerization step be contained. The particles to be added are preferably spherical particles such as silica and cross-linked poisoner, especially those having a sphericity of not more than 1.5, preferably not more than 1.3, still more preferably not more than 1.1. Further, the particle size distribution is preferably uniform and those having a relative standard deviation of the particle size of not more than 0.6, more preferably not more than 0.5, are preferred. The particles may be added to composition A and/or composition B during the polymerization, or may be added and kneaded when the polymer is melted after polymerization.

A preferred surface configuration may be attained by controlling the relationship among the amount and average particle size of the inert particles added to composition A and the thickness of the surface layer so that the following equation (9), more preferably equation (10), is satisfied:

$$0.1 \leq c \cdot t / D \leq 5 \qquad (9)$$

$$0.1 \leq c \cdot t / D \leq 2 \qquad (10)$$

wherein D (μm) represents average particle size of the inert particles, t (μm) represents the thickness of the surface layer, and c represents the content (wt %) of the inert particles added to composition A.

The methods for measuring characteristics and methods for evaluating the characteristics relating to the present invention will now be described.

(1) Thickness of Overall Film and Each Layer

The thicknesses of the overall film and of each layer were determined by observing a cross-section of the laminated film with a scanning electron microscope.

(2) Tensile Strength and Tensile Elongation

The tensile elongation at break and tensile strength at break of a sample with a width of 10 mm and a length of 50 mm were measured by using a Tensilon type tensile tester, and the average of 5 samples was calculated.

(3) Melt Viscosity

The melt viscosity was measured with a Kokashiki flow tester.

(4) Heat Shrinkage

A sample film with a length of 200 mm and a width of 10 mm was heated at 230° C. for 10 minutes in a hot air oven under no load and the heat shrinkage was calculated from the lengths before and after the heat treatment.

(5) Tear Strength

The tear strength was measured in accordance with JIS-P8116-1960 and is expressed in terms of g/mm.

(6) Melting Point

The melting point was measured by using a differential scanning calorimeter (DSC-2).

(7) Heat Resistance

The tensile strength of a sample film was measured before and after 2000 hours' aging at 180° C. in a hot air oven according to ASTM-D-638-72. Those having tensile strengths after the aging of not less than 70% of the initial strengths are expressed by the symbol "⊙", those having the above-mentioned value of not less than 50% and less than 70% are expressed by the symbol "○", those having the above-mentioned value of not less than 30% and less than 50% are expressed by the symbol "Δ", and those having the above-mentioned value of less than 30% are expressed by the symbol "X".

(8) Surface Roughness

The surface roughness of the surface layer was measured in accordance with JIS R-0601.

(9) Adhesiveness

A cellophane tape (commercially available from Nichiban) is adhered to a film having a width of W (cm), and the cellophane tape is peeled off at an angle of 180° at a velocity of 200 mm/min, and the tension T (g) during the peeling off is measured. The adhesiveness is expressed in terms of the force of peeling off expressed by the equation:

(Force of Peeling Off) (g/cm) = $T/W$.

Those having the force of peeling off of not less than 10 g/cm are expressed by the symbol "⊙", those having the value of not lees than 6 g/cm and less than 10 g/cm are expressed by the symbol "○", those having the value of not less than 4 g/cm and less than 6 g/cm are expressed by the symbol "Δ", and those having the value of less than 4 g/cm are expressed by the symbol "X".

(10) Heatsealability

On the surface to be subjected to heatsealing of a square sample film sizing 10 cm × 10 cm, a square film sizing 10 cm × 10 cm of Torelina (commercially available from Toray Industries, Inc., 25 μm) was overlaid and the resulting laminate was subjected to heat press at 200° C. for 10 seconds. Thereafter, it was tried to peel off the Torelina with fingers. Those wherein the Torelina could not be peeled off at all are expressed by the symbol "○", those wherein the Torelina was gradually peeled off even though there was resistance are expressed by the symbol "Δ", and those wherein the Torelina was easily peeled off are expressed by the symbol "X".

The invention will now be described by way of examples thereof. It should be noted that the present invention is not limited to the examples.

EXAMPLE 1

(1) Production of Phenylene Sulfide Copolymer Composition

In an autoclave, 100 moles of sodium sulfide nonahydrate, 45 moles of sodium acetate and 25 liters of N-methyl-2-pyrrrolidone (hereinafter referred to as "NMP" for short) were supplied and the mixture was gradually heated to 220° C. under stirring, thereby removing the contained water by distillation.

To the thus dehydrated system, 91 moles of p-dichlorobenzene as a major component monomer, 10 moles of m-dichlorobenzene and 0.2 moles of 1,2,4-trichlorobenzene as minor component monomers were added together with 5 liters of NMP. After sealing nitrogen gas at 170° C. and at 3 kg/cm², the temperature of the mixture was raised, and the polymerization was carried out at 260° C. for 4 hours. After the polymerization, the reaction product was cooled to precipitate the polisher in distilled water, and the polymer in the form of small granules was collected by using a metal gauze of 150 mesh.

The thus obtained polymer was washed 5 times with distilled water at 90° C., and the polymer was then dried under reduced pressure at 120° C. to obtain phenylene sulfide copolymer in the form of white granules having a melt viscosity of 1000 poise and a melting point of 253° C.

To 10 kg of the thus obtained phenylene sulfide copolymer, 50 g of spherical silica particles with a diameter of 0.5 μm were blended and the resultant was extruded in the form of gut at 320° C. by a biaxial extruder having a diameter of 30 mm and pelletized.

(2) Production of Poly-p-phenylene Sulfide Composition

The process for producing the phenylene sulfide copolymer composition described in (1) was repeated except that 101 moles of p-dichlorobenzene was used as the major component monomer and no minor component monomers were used, to produce poly-p-phenylene sulfide composition.

The melt viscosity of the poly-p-phenylene sulfide was 3000 poise and the melting point thereof was 283° C.

(3) Film Forming

The phenylene sulfide copolymer composition and the poly-p-phenylene sulfide composition obtained in (1) and (2) described above were dried at 180° C. for 3 hours under a reduced pressure of 1 mm Hg, and the compositions were supplied to different extruders, respectively. The compositions in melted state were introduced to a lamination apparatus of a double tube type located at an upper portion of a die such that the inner layer is constituted by the poly-p-phenylene sulfide composition. The compositions were then extruded from a subsequent T-die and the extruded sheet was rapidly cooled with a rotating cooling drum to obtain a two-layered laminated sheet of phenylene sulfide copolymer composition/poly-p-phenylene sulfide composition.

The thus obtained laminated sheet was made to run by contacting the film with a plurality of heated rolls with a surface temperature of 90° C. and the sheet was stretched in the longitudinal direction at a stretching ratio of 3.7 times the original length between the group of the heated rolls and a cooling roll at 30° C. having a different circumference velocity. The thus obtained uniaxially oriented sheet was stretched in the direction perpendicular to the longitudinal direction using a tenter at a stretching ratio of 3.5 times the original length, followed by heat set at 260° C. for 10 seconds to obtain a laminated film according to the present invention with an overall thickness of 25 μm and a thickness of the phenylene sulfide copolymer film layer of 2 μm.

The structure and the results of evaluations of this film are shown in Tables 1 and 8.

Comparative Example 1

The poly-p-phenylene sulfide composition prepared in Example 1(2) was supplied to an extruder and extruded in the form of a single layer through a T-die, and the extruded sheet was biaxially stretched and heat set under the same film-forming conditions as in Example 1(3) to obtain a biaxially oriented poly-p-phenylene sulfide film. The structure and the results of evaluations of this film are shown in Tables 1 and 8.

Comparative Example 2

A phenylene sulfide copolymer film was prepared by the same procedure as in Example 1 except that the phenylene sulfide copolymer composition prepared in Example 1(1) alone was used and that the temperature of heat set was 220° C. The results of evaluations are shown in Table 8.

Examples 2 and 3, and Comparative Examples 3 and 4

Laminated polyphenylene sulfide films were prepared by the same process as in Example 1 except that the amounts of the p-dichlorobenzene as the major component monomer and of the m-dichlorobenzene as the minor component monomer were changed. The details of the layer structures and results of evaluations are shown in Tables 2, 3 and 8.

Examples 4–6

Laminated polyphenylene sulfide films were prepared by the same process as in Example 1 except that the thicknesses of the phenylene sulfide copolymer film and of the overall laminated film were changed. The details of the structures and results of evaluations are shown in Tables 4 and 8.

Examples 7–9

Laminated films were prepared by the same process as in Example 1 except that the laminating apparatus was changed to one by which the phenylene sulfide copolymer films form both surfaces of the laminated film, to obtain a three-layered film (phenylene sulfide copolymer film/biaxially oriented poly-p-phenylene sulfide film/phenylene sulfide copolymer film). The details of the structures and results of evaluations are shown in Tables 5 and 9.

Examples 10–12

Laminated polyphenylene sulfide films were prepared by the same process as in Example 1 except that the types and amounts of the phenylene sulfide copolymer and particles blended in the poly-p-phenylene sulfide were changed. The details of the structures and results of evaluations are shown in Tables 6 and 9.

Example 13

A laminated film was prepared by the same process as in Example 1 except that the temperature at which the biaxially stretched film was heat set was 220° C. The results of evaluations of the film are shown in Table 9.

Example 14

A laminated film was prepared by the same process as in Example 1 except that

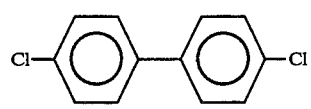

was used as the minor component monomer. The results of evaluations of the film are shown in Table 9.

TABLE 1

| | Layer Structure | A. Surface Layer Film Composition | | Thickness (μm) | B. Central Layer Film Composition | | Total Film Thickness (μm) |
|---|---|---|---|---|---|---|---|
| Example 1 | A/B | p-phenylene sulfide<br>m-phenylene sulfide<br>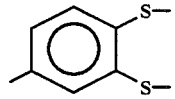<br>0.5 μm spherical silica | 89.8 mol %<br>10 mol %<br>0.2 mol %<br><br>0.5 wt % | 2 | p-phenylene sulfide<br>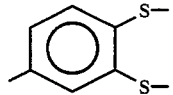<br>0.5 μm spherical silica | 99.8 mol %<br>0.2 mol %<br><br>0.5 wt % | 25 |
| Comparative Example 1 | B alone | — | — | — | p-phenylene sulfide<br>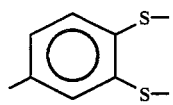<br>0.5 μm spherical silica | 99.8 mol %<br>0.2 mol %<br><br>0.5 wt % | 25 |
| Comparative Example 2 | A alone | p-phenylene sulfide<br>m-phenylene sulfide<br><br>0.5 μm spherical silica | 89.8 mol %<br>10 mol %<br>0.2 mol %<br><br>0.5 wt % | 25 | — | | 25 |

TABLE 2

| | Layer Structure | A. Surface Layer Film Composition | | Thickness (μm) | B. Central Layer Film Composition | | Total Film Thickness (μm) |
|---|---|---|---|---|---|---|---|
| Example 2 | A/B | p-phenylene sulfide<br>m-phenylene sulfide<br>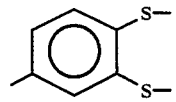<br>0.5 μm spherical silica | 94.8 mol %<br>5.0 mol %<br>0.2 mol %<br><br>0.5 wt % | 2 | p-phenylene sulfide<br>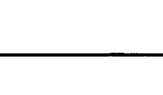<br>0.5 μm spherical silica | 99.8 mol %<br>0.2 mol %<br><br>0.5 wt % | 25 |
| Example 3 | A alone | p-phenylene sulfide<br>m-phenylene sulfide<br>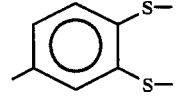<br>0.5 μm spherical silica | 69.8 mol %<br>30 mol %<br>0.2 mol %<br><br>0.5 wt % | 2 | p-phenylene sulfide<br>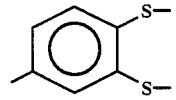<br>0.5 μm spherical silica | 99.8 mol %<br>0.2 mol %<br><br>0.5 wt % | 25 |

TABLE 3

| | Layer Structure | A. Surface Layer Film Composition | | Thickness (μm) | B. Central Layer Film Composition | | Total Film Thickness (μm) |
|---|---|---|---|---|---|---|---|
| Comparative Example 3 | A/B | p-phenylene sulfide<br>m-phenylene sulfide<br>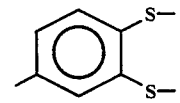 | 96.8 mol %<br>3.0 mol %<br>0.2 mol % | 2 | p-phenylene sulfide<br>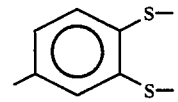 | 99.8 mol %<br>0.2 mol % | 25 |

TABLE 3-continued

| | Layer Structure | A. Surface Layer Film Composition | | Thickness (μm) | B. Central Layer Film Composition | | Total Film Thickness (μm) |
|---|---|---|---|---|---|---|---|
| Comparative Example 4 | A/B | 0.5 μm spherical silica<br>p-phenylene sulfide<br>m-phenylene sulfide<br>[benzene with two S— substituents]<br>0.5 μm spherical silica | 0.5 wt %<br>49.8 mol %<br>50 mol %<br>0.2 mol %<br>0.5 wt % | 2 | 0.5 μm spherical silica<br>p-phenylene sulfide<br>[benzene with two S— substituents]<br>0.5 μm spherical silica | 0.5 wt %<br>99.8 mol %<br>0.2 mol %<br>0.5 wt % | 25 |

TABLE 4

| | Layer Structure | A. Surface Layer Film Composition | | Thickness (μm) | B. Central Layer Film Composition | | Total Film Thickness (μm) |
|---|---|---|---|---|---|---|---|
| Example 4 | A/B | p-phenylene sulfide<br>m-phenylene sulfide<br>[benzene with two S— substituents]<br>0.5 μm spherical silica | 89.8 mol %<br>10 mol %<br>0.2 mol %<br>0.5 wt % | 0.5 | p-phenylene sulfide<br>[benzene with two S— substituents]<br>0.5 μm spherical silica | 99.8 mol %<br>0.2 mol %<br>0.5 wt % | 25 |
| Example 5 | A/B | p-phenylene sulfide<br>m-phenylene sulfide<br>[benzene with two S— substituents]<br>0.5 μm spherical silica | 89.8 mol %<br>10 mol %<br>0.2 mol %<br>0.5 wt % | 10 | p-phenylene sulfide<br>[benzene with two S— substituents]<br>0.5 μm spherical silica | 99.8 mol %<br>0.2 mol %<br>0.5 wt % | 25 |
| Example 6 | A/B | p-phenylene sulfide<br>m-phenylene sulfide<br>[benzene with two S— substituents]<br>0.5 μm spherical silica | 89.8 mol %<br>10 mol %<br>0.2 mol %<br>0.5 wt % | 2 | p-phenylene sulfide<br>[benzene with two S— substituents]<br>0.5 μm spherical silica | 99.8 mol %<br>0.2 mol %<br>0.5 wt % | 100 |

TABLE 5

| | Layer Structure | A. Surface Layer Film Composition | | Thickness (μm) | B. Central Layer Film Composition | | Total Film Thickness (μm) |
|---|---|---|---|---|---|---|---|
| Example 7 | A/B/A | p-phenylene sulfide<br>m-phenylene sulfide<br>[benzene with two S— substituents]<br>0.5 μm spherical silica | 89.8 mol %<br>10 mol %<br>0.2 mol %<br>0.5 wt % | 2 | p-phenylene sulfide<br>[benzene with two S— substituents]<br>0.5 μm spherical silica | 99.8 mol %<br>0.2 mol %<br>0.5 wt % | 25 |
| Example 8 | A/B/A | p-phenylene sulfide<br>m-phenylene sulfide | 89.8 mol %<br>10 mol % | 0.5 | p-phenylene sulfide | 99.8 mol % | 25 |

TABLE 5-continued

| | Layer Structure | A. Surface Layer Film Composition | Thickness (μm) | B. Central Layer Film Composition | | Total Film Thickness (μm) |
|---|---|---|---|---|---|---|
| Example 9 | A/B/A | [benzene ring with two S— groups] | 0.2 mol % | [benzene ring with two S— groups] | 0.2 mol % | 25 |
| | | 0.5 μm spherical silica | 0.5 wt % | 0.5 μm spherical silica | 0.5 wt % | |
| | | p-phenylene sulfide 89.8 mol %<br>m-phenylene sulfide 10 mol % | 6 | p-phenylene sulfide 99.8 mol % | | |
| | | [benzene ring with two S— groups] | 0.2 mol % | [benzene ring with two S— groups] | 0.2 mol % | |
| | | 0.5 μm spherical silica | 0.5 wt % | 0.5 μm spherical silica | 0.5 wt % | |

TABLE 6

| | Layer Structure | A. Surface Layer Film Composition | | Thickness (μm) | B. Central Layer Film Composition | | Total Film Thickness (μm) |
|---|---|---|---|---|---|---|---|
| Example 10 | A/B | p-phenylene sulfide<br>m-phenylene sulfide | 89.8 mol %<br>10 mol % | 2 | p-phenylene sulfide | 99.8 mol % | 25 |
| | | [benzene ring with two S— groups] | 0.2 mol % | | [benzene ring with two S— groups] | 0.2 mol % | |
| | | 0.5 μm spherical silica | 0.5 wt % | | No particle contained | | |
| Example 11 | A/B | p-phenylene sulfide<br>m-phenylene sulfide | 89.8 mol %<br>10 mol % | 2 | p-phenylene sulfide | 99.8 mol % | 25 |
| | | [benzene ring with two S— groups] | 0.2 mol % | | [benzene ring with two S— groups] | 0.2 mol % | |
| | | 1.0 μm spherical silica | 0.9 wt % | | 1.0 μm calcium carbonate | 0.9 wt % | |
| Example 12 | A/B | p-phenylene sulfide<br>m-phenylene sulfide | 89.8 mol %<br>10 mol % | 2 | p-phenylene sulfide | 99.8 mol % | 25 |
| | | [benzene ring with two S— groups] | 0.2 mol % | | [benzene ring with two S— groups] | 0.2 mol % | |
| | | 0.2 μm spherical silica | 1.0 wt % | | 0.2 μm spherical silica | 1.0 wt % | |

TABLE 7

| | Layer Structure | A. Surface Layer Film Composition | | Thickness (μm) | B. Central Layer Film Composition | | Total Film Thickness (μm) |
|---|---|---|---|---|---|---|---|
| Example 13 | A/B | p-phenylene sulfide<br>m-phenylene sulfide | 89.8 mol %<br>10 mol % | 2 | p-phenylene sulfide | 99.8 mol % | 25 |
| | | [benzene ring with two S— groups] | 0.2 mol % | | [benzene ring with two S— groups] | 0.2 mol % | |
| | | 0.5 μm spherical silica | 0.5 wt % | | 0.5 μm spherical silica | 0.5 wt % | |

TABLE 7-continued

| | | A. Surface Layer Film | | | B. Central Layer Film | | Total Film |
| | Layer | | | Thickness | | | Thickness |
| | Structure | Composition | | (μm) | Composition | | (μm) |
| --- | --- | --- | --- | --- | --- | --- | --- |
| Example 14 | A/B | p-phenylene sulfide | 89.8 mol % | 2 | p-phenylene sulfide | 99.8 mol % | 25 |
| | | [biphenyl sulfide structure] | 10 mol % | | | | |
| | | [disubstituted benzene disulfide structure] | 0.2 mol % | | [disubstituted benzene disulfide structure] | 0.2 mol % | |
| | | 0.5 μm spherical silica | 0.5 wt % | | 0.5 μm spherical silica | 0.5 wt % | |

TABLE 8

| | | Mechanical Properties | | | | | |
| | Surface Roughness (μm) | Tensile Strength (kg/mm²) | Tensile Elongation (%) | Tear Strength (g/mm) | Heat Shrinkage (%) | Heat Resistance | Adhesiveness | Heat Sealability |
| --- | --- | --- | --- | --- | --- | --- | --- | --- |
| Example 1 | 0.041 | 23 | 92 | 327 | 3.0 | ⊙ | ⊙ | ○ |
| Example 2 | 0.045 | 23 | 94 | 318 | 3.4 | ⊙ | ⊙ | ○ |
| Example 3 | 0.038 | 19 | 85 | 298 | 6.2 | ○ | ○ | ○ |
| Example 4 | 0.035 | 24 | 95 | 302 | 2.9 | ⊙ | ⊙ | ○ |
| Example 5 | 0.031 | 17 | 78 | 293 | 6.7 | Δ | ⊙ | ○ |
| Example 6 | 0.036 | 23 | 99 | 331 | 2.8 | ⊙ | ⊙ | ○ |
| Comparative Example 1 | 0.043 | 23 | 92 | 250 | 3.0 | ⊙ | X | X |
| Comparative Example 2 | 0.043 | 12 | 60 | 214 | Not less than 12% | X | ○ | Δ |
| Comparative Example 3 | 0.041 | 23 | 91 | 253 | 3.0 | ⊙ | ○ | X |
| Comparative Example 4 | 0.042 | 11 | 57 | 253 | Not less than 12% | X | ○ | X |

TABLE 9

| | | Mechanical Properties | | | | | |
| | Surface Roughness (μm) | Tensile Strength (kg/mm²) | Tensile Elongation (%) | Tear Strength (g/mm) | Heat Shrinkage (%) | Heat Resistance | Adhesiveness | Heat Sealability |
| --- | --- | --- | --- | --- | --- | --- | --- | --- |
| Example 7 | 0.042 | 23 | 92 | 340 | 3.0 | ⊙ | ⊙ | ○ |
| Example 8 | 0.034 | 23 | 94 | 315 | 2.9 | ⊙ | ⊙ | ○ |
| Example 9 | 0.037 | 16 | 75 | 292 | 6.5 | Δ | ⊙ | ○ |
| Example 10 | 0.039 | 23 | 93 | 325 | 3.0 | ⊙ | ⊙ | ○ |
| Example 11 | 0.064 | 23 | 90 | 315 | 3.0 | ⊙ | ⊙ | ○ |
| Example 12 | 0.010 | 23 | 95 | 320 | 3.0 | ⊙ | ⊙ | ○ |
| Example 13 | 0.040 | 22 | 98 | 265 | Not less than 12% | ⊙ | ○ | Δ |
| Example 14 | 0.047 | 27 | 85 | 335 | 3.4 | ⊙ | ⊙ | ○ |

INDUSTRIAL APPLICABILITY

As described above, since the laminated polyphenylene sulfide film according to the present invention has excellent adhesiveness, especially heatsealability, and has balanced mechanical properties including tear strength and heat resistance, the laminated film can be used for a wide variety of uses such as for wrapping, electrical insulation and general industrial applications. The advantageous effects of the film of the present invention are especially prominent when the film is used as an adhesive tape and outer packages of electrical and electronics elements.

Further, the film may be used for constituting composite materials by laminating the film with other films, papers, fiber sheets and glass cloths.

We claim:
1. A laminated polyphenylene sulfide film comprising a central layer consisting essentially of a biaxially oriented poly-p-phenylene sulfide film, and a surface layer consisting essentially of a phenylene sulfide copolymer film in which at least one copolymerization unit other than p-phenylene sulfide unit is copolymerized with p-phenylene sulfide unit, which is laminated on at least one surface of the central layer, the resin compositions constituting said layers satisfying the following equations (1)–(4):

$$50 \leqq PPSF(A) \leqq 95 \tag{1}$$

$$PPSF(B) \geqq 90 \tag{2}$$

$$3 \leqq COPF(A) < 50 \tag{3}$$

$$PPSF(A) < PPSF(B) \quad (4)$$

wherein
- PPSF(A) is the content of p-phenylene sulfide unit in said surface layer in terms of mol % with respect to the total repeating units in said surface layer;
- PPSF(B) is the content of p-phenylene sulfide unit in said central layer in terms of mol % with respect to the total repeating units in said central layer; and
- COPF(A) is the content of copolymerization unit in said surface layer, whose content is the second largest next to that of p-phenylene sulfide unit, in terms of mol % with respect to the total repeating units in said surface layer.

2. The laminated polyphenylene sulfide film of claim 1, wherein said phenylene sulfide copolymer film constituting said surface layer is substantially non-oriented.

3. The laminated polyphenylene sulfide film of claim 1, wherein said copolymerization unit whose content is the second largest next to that of p-phenylene sulfide unit is m-phenylene sulfide unit.

4. The laminated polyphenylene sulfide film of claim 1, wherein said surface layer has a thickness of 0.01–5 μm.

5. A process of producing a laminated polyphenylene sulfide film comprising the steps of laminating on at least one surface of a poly-p-phenylene sulfide composition a phenylene sulfide copolymer in which at least one copolymerization unit other than p-phenylene sulfide unit is copolymerized with p-phenylene sulfide unit by co-extrusion to obtain a laminated sheet; biaxially stretching the laminated sheet; and heat-setting the resultant; the compositions of said phenylene sulfide copolymer composition and said poly-p-phenylene sulfide composition satisfying the following equations (5)–(8):

$$50 \leq PPSP(A) \leq 95 \quad (5)$$

$$PPSP(B) \geq 90 \quad (6)$$

$$3 \leq COPP(A) < 5 \quad (7)$$

$$PPSP(A) < PPSP(B) \quad (8)$$

wherein
- PPSP(A) is the content of p-phenylene sulfide unit in the phenylene sulfide copolymer composition in terms of mol % with respect to the total repeating units in said phenylene sulfide copolymer composition;
- PPSP(B) is the content of p-phenylene sulfide unit in the poly-p-phenylene sulfide composition in terms of mol % with respect to the total repeating units in said poly-p-phenylene sulfide composition; and
- COPP(A) is the content of copolymerization unit in the phenylene sulfide copolymer composition, whose content is the second largest next to that of p-phenylene sulfide unit, in terms of mol % with respect to the total repeating units in said phenylene sulfide copolymer composition.

* * * * *

UNITED STATES PATENT AND TRADEMARK OFFICE
CERTIFICATE OF CORRECTION

PATENT NO. : 5,346,762
DATED : September 13, 1994
INVENTOR(S) : Kenji Kida et al It is certified that error appears in the above-indentified patent and that said Letters Patent is hereby corrected as shown below:

In column 20, line 55, delete "central" and substitute --biaxially oriented--;
line 61, delete "the central" and substitute --biaxially oriented--.

In column 21, line 9, delete "central" and substitute --biaxially oriented--;
line 10, delete "central" and substitute --biaxially oriented--.

Signed and Sealed this

Twenty-ninth Day of November, 1994

Attest:

BRUCE LEHMAN

*Attesting Officer*  *Commissioner of Patents and Trademarks*